No. 762,844. PATENTED JUNE 14, 1904.
W. G. PRICE.
BRAKE RIGGING FOR TRUCKS, &c.
APPLICATION FILED OCT. 17, 1903.
NO MODEL.
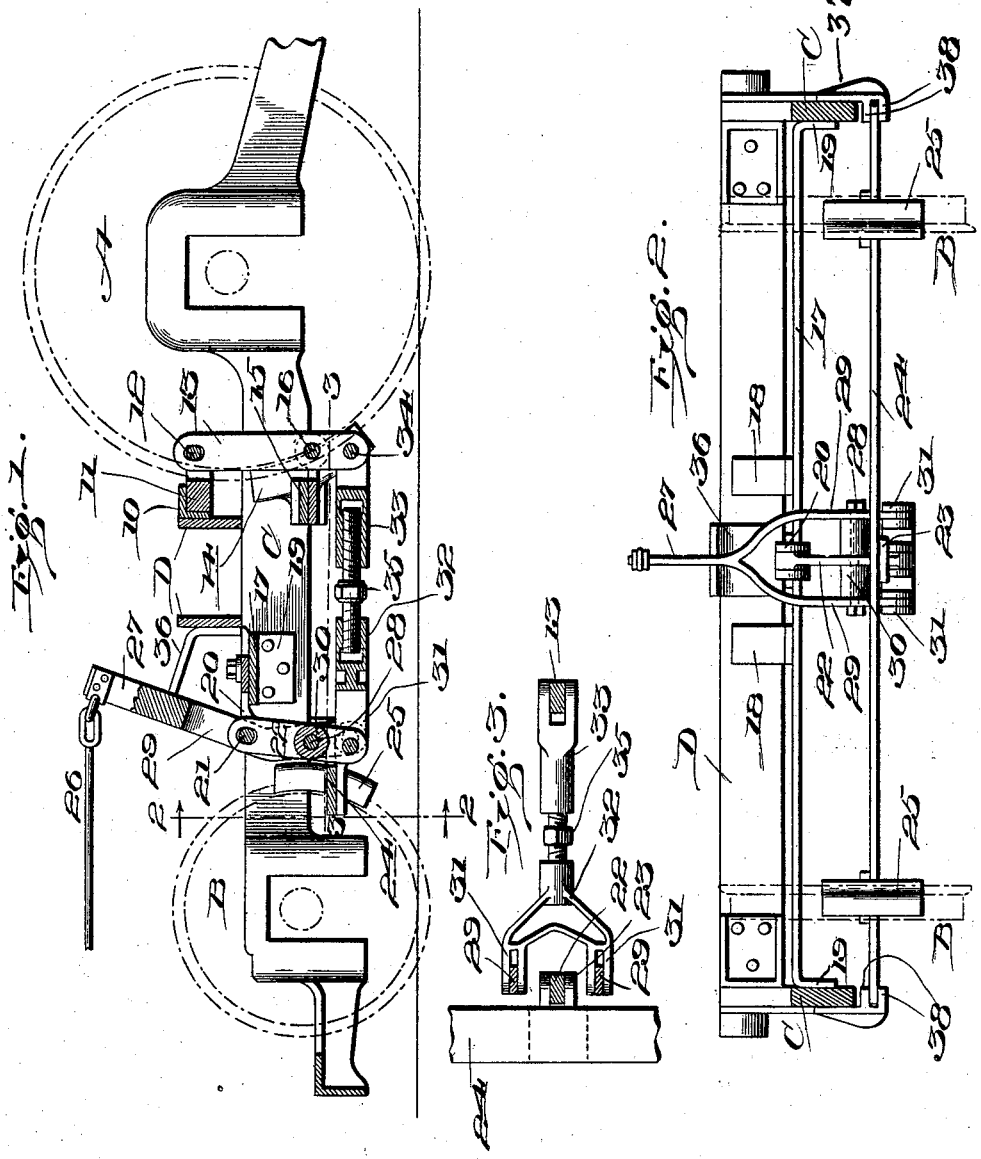

No. 762,844.

Patented June 14, 1904.

UNITED STATES PATENT OFFICE.

WILLIAM G. PRICE, OF KINGSTON, NEW YORK.

BRAKE-RIGGING FOR TRUCKS, &c.

SPECIFICATION forming part of Letters Patent No. 762,844, dated June 14, 1904.

Original application filed December 6, 1901, Serial No. 84,894. Divided and this application filed October 17, 1903. Serial No. 177,419. (No model.)

*To all whom it may concern:*

Be it known that I, WILLIAM G. PRICE, residing at Kingston, in the county of Ulster and State of New York, have invented certain new and useful Improvements in Brake-Rigging for Trucks, &c., of which the following is a full, clear, and exact description, such as will enable others skilled in the art to which it appertains to make and use the same.

This invention relates to brake mechanism for trucks and the like; and its object is to provide improved means for the transmission of power to the brake-shoes. More specifically, its object is to provide an improved brake mechanism wherein the brake-pressure may be distributed unequally between the pairs of wheels, so that one set of wheels which carries the greater load, as is a common construction in trucks of the type known as "maximum traction," shall receive a proportionately large part of the braking pressure.

Other objects and advantages will be in part obvious from the description hereinafter and in part pointed out.

The invention accordingly consists in the features of construction, combinations of elements, and arrangement of parts, which will be hereinafter fully described, and the novel features thereof pointed out in the claims.

In the accompanying drawings, which illustrate an embodiment of the invention, Figure 1 is a longitudinal sectional view showing, conventionally, the wheels and frame of a maximum-traction truck with my improved brake-rigging applied thereto. Fig. 2 is a section on the line 2 2 of Fig. 1 looking in the direction of the arrows. Fig. 3 is a detail, partly in section and partly in top plan, taken substantially on the line 3 3 of Fig. 1 and looking downwardly.

Similar reference characters refer to similar parts throughout the several views.

The large and small wheels of the truck are shown at A and B, respectively, and the frame is indicated by C. Secured by angle-plates 10 to one of the transom-bars D is the rigid cross-beam 11 in a bracket or lugs, projecting from which is pivoted on the pin 12 lever 13. Brake-shoes 14 for the large wheels of the truck are carried by brake-beam 15, which is connected to the lever 13, being pivotally connected thereto in the present construction at the point 16, located well below the center of said lever. To the other transom-bar D the cross-beam 17 is rigidly secured, as by the angle-plates 18 18, said cross-beam being also secured to the side frames by suitable bolts or rivets passing through the downturned ends of said beam and the side frames, as at 19 19. A clevis 20 is secured to the beam 17, substantially in the center of the truck, as shown in the illustration, although this position is not essential, and between the projecting side pieces of said clevis is pivoted on pin 21 the end of lever 22, which because of its function in the present construction may be called a "dividing" or "divisional" lever. A clevis 23, connected to the other end of this dividing-lever, is connected to the brake-beam 24, which carries the brake-shoes 25 of the wheels B.

A brake-rod 26, to which power may be supplied from any suitable source, is connected to the end of a lever 27, which may be termed, as here used, a "floating" or "live" lever, in contradistinction to the lever 13, which is a "dead" lever, as those terms are understood in this art. Lever 27 is bifurcated downwardly, and a pin 28 passes through the two legs 29 29 thereof and through a sleeve 30, which is integral with or rigidly attached to the dividing-lever 22, such that the lever 27 is pivotally mounted upon lever 22 by means of said pin 28 and somewhat below the center thereof. The ends of the legs 29 29 pass through and are connected in the bifurcated ends 31 of a casting or connection 32, which forms a part of the connection between the levers 13 and 27, said connection comprising also the casting 33, bifurcated at its end to receive the end of the lever 13, which is pivotally mounted therein upon a pin 34. The two castings 32 and 33 are preferably connected, as shown, by the threaded turnbuckle-rod 35, such that the relation between the two may be adjusted. An angle-piece 36, connected to the transom D, limits the motion of the floating lever 27 toward the transom.

The ends of the brake-beams 15 and 24 are preferably supported by and guided in suitable castings secured to the side frames, which castings have projecting webs or guides. These castings are shown in Fig. 2 in connection with the brake-beam 24 as having a vertical part 37, adapted to be suitably secured to the side frame, and with horizontally-projecting webs 38, between which webs the brake-beam is guided and supported for movement of the brake-shoes to and from the wheels.

In the preferable construction and as shown in Fig. 1 the levers 13 and 22, which are pivotally mounted with relation to the frame, are provided with elongated slots, through which the pins 12 and 21 pass. In order to secure the most efficient action, the proportions of these slots should be such that the pins never touch the tops or bottoms of the slots, so that the brake-beams are always carried by the supporting-guides, at or near the ends thereof. If such elongated slots were not provided, the brake-beams would have a tendency to buckle at the centers thereof during the movement of the beam required to wear out its shoes.

The operation of this brake mechanism will now be easily understood. Power applied through the brake-rod to the floating lever 27 will tend to swing said lever about its pivotal point on the pin or rod 28, so that it will pivot with relation to the lever 22 at its lower end and being then thrown to the right will through the described connections throw the lever 13 toward the wheels and set the brake-shoes 14; but at the same time practically that the lever 27 is pivoted about the lever 22 it will have a tendency to swing said lever 22 itself upon its pivot at 21, throwing it forward toward the small wheels, thereby setting the brake-shoes 25 against said wheels. So far as the practical operation of the invention is concerned it is immaterial whether the action of the two brake-beams is defined as simultaneous or successive. For all practical purposes it occurs at the same time. The braking pressure applied to the brake-rod 26 will be divided unequally, the greater part being applied to the wheels A, which carry the greater load, owing to the peculiar mounting of the floating lever 27 with respect to the lever 22 and likewise owing to the position of the pivotal points 16 and 28, respectively, off the centers of their respective levers. By properly proportioning the long and short arms of the various levers the braking pressure may be divided to the two sets of wheels in any desired ratio. For this purpose, if desired, one or more of the parts may be provided with a plurality of holes or otherwise-indicated points of connection.

I thus provide a construction which dispenses with the use of springs and other unreliable compensating devices and is powerful, durable, and accurate.

This application is filed as a division of application Serial No. 84,894, filed December 6, 1901, in accordance with the official requirement in said application.

Having described my invention, what I claim as new, and desire to secure by Letters Patent, is—

1. In a brake-rigging for a truck, in combination with the axles, wheels and frame carried thereby, brake-shoes adapted to bear against the wheels, a lever connected to one set of brake-shoes and pivotally supported from the frame, a lever connected to another set of brake-shoes and pivotally supported from the frame, a third lever pivotally mounted with relation to said second lever, and a connection between said first and third levers.

2. In a brake-rigging for a truck, in combination with the axles, wheels and frame carried thereby, brake-shoes adapted to bear against said wheels, and means for distributing the braking pressure unequally to different sets of wheels, said means comprising a lever pivotally supported from the truck-frame and connected to actuate the brake-shoes for one set of wheels, a second lever pivotally supported from the frame and connected to actuate the brake-shoes for another set of wheels, a third lever pivotally mounted with relation to said second lever, and a connecting-rod between said first and third levers.

3. In a brake-rigging, in combination with the axles, wheels and frame carried thereby, brake-shoes adapted to bear against said wheels, a lever pivotally supported from the frame and connected at one side of the center thereof to one set of said brake-shoes, a second lever pivotally supported from the frame and connected at one end thereof to another set of brake-shoes, a third lever pivotally mounted upon said second lever at one side the center thereof, a connecting-rod between the lower ends of said first and third levers, and an actuating connection for said third lever.

4. In a brake-rigging, in combination with the axles, wheels and frame carried thereby, brake-beams carrying brake-shoes adapted to bear against said wheels, a lever pivotally supported at one end from the frame and connected below the center thereof to one of said brake-beams, a second lever pivotally supported at one end from the frame and connected to a second brake-beam adjacent its other end, a third lever pivotally mounted with relation to said second lever below the center thereof, a connecting-rod between the lower ends of said first and third levers, and an actuating connection for the upper end of said third lever.

5. In a brake-rigging, in combination with the axles, wheels and frame carried thereby, brake-beams carrying sets of brake-shoes adapted to bear against said wheels, a lever pivotally supported from the frame and connected to actuate one of said brake-beams, a second lever pivotally supported from the frame and connected to actuate another of said brake-beams, a bifurcated lever embracing said second lever and pivotally mounted with relation thereto by a pin passing through said second lever and through the bifurcations of said third lever, connections between said first and third levers, and an actuating connection for said third lever.

6. In a brake-rigging, in combination with the axles, wheels and frame carried thereby, a brake-beam carrying brake-shoes adapted to bear against the wheels and to be moved to and from said wheels, members carried by the frame adapted to guide and support the ends of said brake-beam, a lever connected to said brake-beam, an elongated slot in said lever, a pin carried by the frame passing through said slot such that the lever may be swung about said pin as a pivot, and means for so swinging said lever.

In testimony whereof I affix my signature in the presence of two witnesses.

WILLIAM G. PRICE.

Witnesses:
EMELINE RUTTER,
AMELIA M. KONSTANZER.